United States Patent
Graefling et al.

(10) Patent No.: US 11,555,899 B2
(45) Date of Patent: Jan. 17, 2023

(54) RANDOM HARDWARE FAULT AND DEGRADATION PROTECTION APPARATUS FOR TIME-OF-FLIGHT RECEIVER

(71) Applicant: Infineon Technologies AG, Neubiberg (DE)

(72) Inventors: Martin Graefling, Graz (AT); Andrzej Gajdardziew, St. Marein bei Graz (AT); Stefan Mendel, Graz (AT); Francesco Secli, Graz (AT)

(73) Assignee: Infineon Technologies AG, Neubiberg (DE)

( * ) Notice: Subject to any disclaimer, the term of this patent is extended or adjusted under 35 U.S.C. 154(b) by 979 days.

(21) Appl. No.: 16/278,889

(22) Filed: Feb. 19, 2019

(65) Prior Publication Data
US 2020/0264287 A1    Aug. 20, 2020

(51) Int. Cl.
| | | |
|---|---|---|
| G01S 7/48 | (2006.01) | |
| G01S 7/4865 | (2020.01) | |
| G01S 17/10 | (2020.01) | |
| G01S 7/484 | (2006.01) | |
| G01S 17/89 | (2020.01) | |
| G01S 7/497 | (2006.01) | |

(52) U.S. Cl.
CPC ............ *G01S 7/4865* (2013.01); *G01S 7/484* (2013.01); *G01S 7/497* (2013.01); *G01S 17/10* (2013.01); *G01S 17/89* (2013.01)

(58) Field of Classification Search
CPC ........ G01S 7/4865; G01S 7/484; G01S 7/497; G01S 17/10; G01S 17/89; G01S 7/4863; G01S 17/42; G01S 17/08; G01S 7/4861; G01S 17/894; G06T 15/08; G06T 2200/04; G06T 2207/10028; G06T 7/33
See application file for complete search history.

(56) References Cited

U.S. PATENT DOCUMENTS

| | | | |
|---|---|---|---|
| 9,547,901 | B2 | 1/2017 | Wang et al. |
| 10,048,356 | B2 | 8/2018 | Takano |
| 2019/0011541 | A1* | 1/2019 | O'Keeffe .............. G01S 7/4816 |
| 2019/0043599 | A1 | 2/2019 | Livezey |
| 2019/0178974 | A1* | 6/2019 | Droz ....................... G01S 3/782 |

FOREIGN PATENT DOCUMENTS

| | | |
|---|---|---|
| DE | 102016011339 A1 | 3/2017 |
| EP | 3239733 A1 | 11/2017 |
| JP | 792266 A | 4/1995 |
| KR | 101822185 B1 | 1/2018 |
| KR | 20190015150 A | 2/2019 |
| WO | 2014208018 A1 | 12/2014 |

\* cited by examiner

*Primary Examiner* — Hovhannes Baghdasaryan
(74) *Attorney, Agent, or Firm* — Harrity & Harrity, LLP

(57) ABSTRACT

A time-of-flight light detection system includes: a plurality of circuits arranged sequentially along a signal path that comprises a plurality of signal channels, the plurality of circuits including a first circuit and a second circuit arranged downstream from the first circuit; a reference signal source configured to generate a plurality of reference signals, where each of the plurality of signal channels at the first circuit receives at least one of the plurality of reference signals; and an evaluation circuit coupled to the plurality of signal channels to receive a processed reference signal from the signal path, the evaluation circuit further configured to compare the processed reference signal to a first expected result to generate a first comparison result.

24 Claims, 9 Drawing Sheets

RANDOM HARDWARE FAULT AND DEGRADATION PROTECTION APPARATUS FOR TIME-OF-FLIGHT RECEIVER

FIELD

The present disclosure relates generally to devices and methods for time-of-flight (TOF) receivers.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

LIDAR receiver systems require ISO26262 compliant development according to ASIL-B/-C/-D. Reliable propagation of photodetector current signals to LIDAR system controller integrated circuit (IC) along a receiver signal path and reporting in case of deviations/faults is needed to comply with this requirement.

In current LIDAR systems, an extra laser diode flash, point laser, or bar laser is used to perform a continuous check of the optical system including the photodetector array. This is a basic check of the photodetector cell and will not be sufficient to check all technical relevant parameters of the receiver IC, such as gain, cut-off-frequency, group delay, etc.

Therefore, an improved device having an improved way of monitoring the receiver signal path may be desirable.

SUMMARY

Embodiments provide time-of-flight systems and methods for operating the same, and, more particularly, to detecting hardware faults and degradation in a time-of-flight receiver.

According to one or more embodiments, a time-of-flight light detection system includes: a plurality of circuits arranged sequentially along a signal path that includes a plurality of signal channels, the plurality of circuits including a first circuit and a second circuit arranged downstream from the first circuit; a reference signal source configured to generate a plurality of reference signals, where each of the plurality of signal channels at the first circuit receives at least one of the plurality of reference signals; and an evaluation circuit coupled to the plurality of signal channels to receive a processed reference signal from the signal path, the evaluation circuit further configured to compare the processed reference signal to a first expected result to generate a first comparison result.

According to one or more embodiments, a time-of-flight light detection receiver system, includes: a plurality of circuits arranged sequentially along a signal path that includes a plurality of signal channels, the plurality of circuits including a first circuit and a second circuit arranged downstream from the first circuit; a reference signal source configured to generate a plurality of reference signals, each of the plurality of signal channels at the first circuit receives at least one of the plurality of reference signals; the first circuit including a plurality of readout elements and a plurality of photodetector readout channels representative of a first portion of the plurality of signal channels and coupled to the plurality of readout elements, the plurality of readout elements configured to selectively route the plurality of reference signals to the plurality of photodetector readout channels; the second circuit including a plurality of processing channels representative of a second portion of the plurality of signal channels, the plurality of processing channels including a plurality of processing elements configured to generate processed reference signals derived from the plurality of reference signals and output the processed reference signals from the second circuit; and an evaluation circuit coupled to the signal path to receive a processed reference signal of the processed reference signals, the evaluation circuit configured to compare the processed reference signal to a first expected result to generate a first comparison result.

According to one or more embodiments, a method is provided for evaluating at least one characteristic of a plurality of signal channels in a time-of-flight light detection system that includes a plurality of circuits arranged sequentially along a time-of-flight light detection signal path that includes the plurality of signal channels, the plurality of circuits including a first circuit and a second circuit arranged downstream from the first circuit. The method includes generating a plurality of reference signals; injecting at least one of the plurality of reference signals into each of the plurality of signal channels at the first circuit such that the plurality of reference signals are processed in the signal path; comparing a processed reference signal to an expected result to generate a comparison result; evaluating the at least one characteristic of at least one of the plurality of signal channels based on the comparison result; and determining whether either of the first circuit or the second circuit is defective based on the at least one evaluated characteristic of the at least one of plurality of signal channels.

BRIEF DESCRIPTION OF THE DRAWINGS

Embodiments are described herein making reference to the appended drawings.

DETAILED DESCRIPTION

Figure 1:
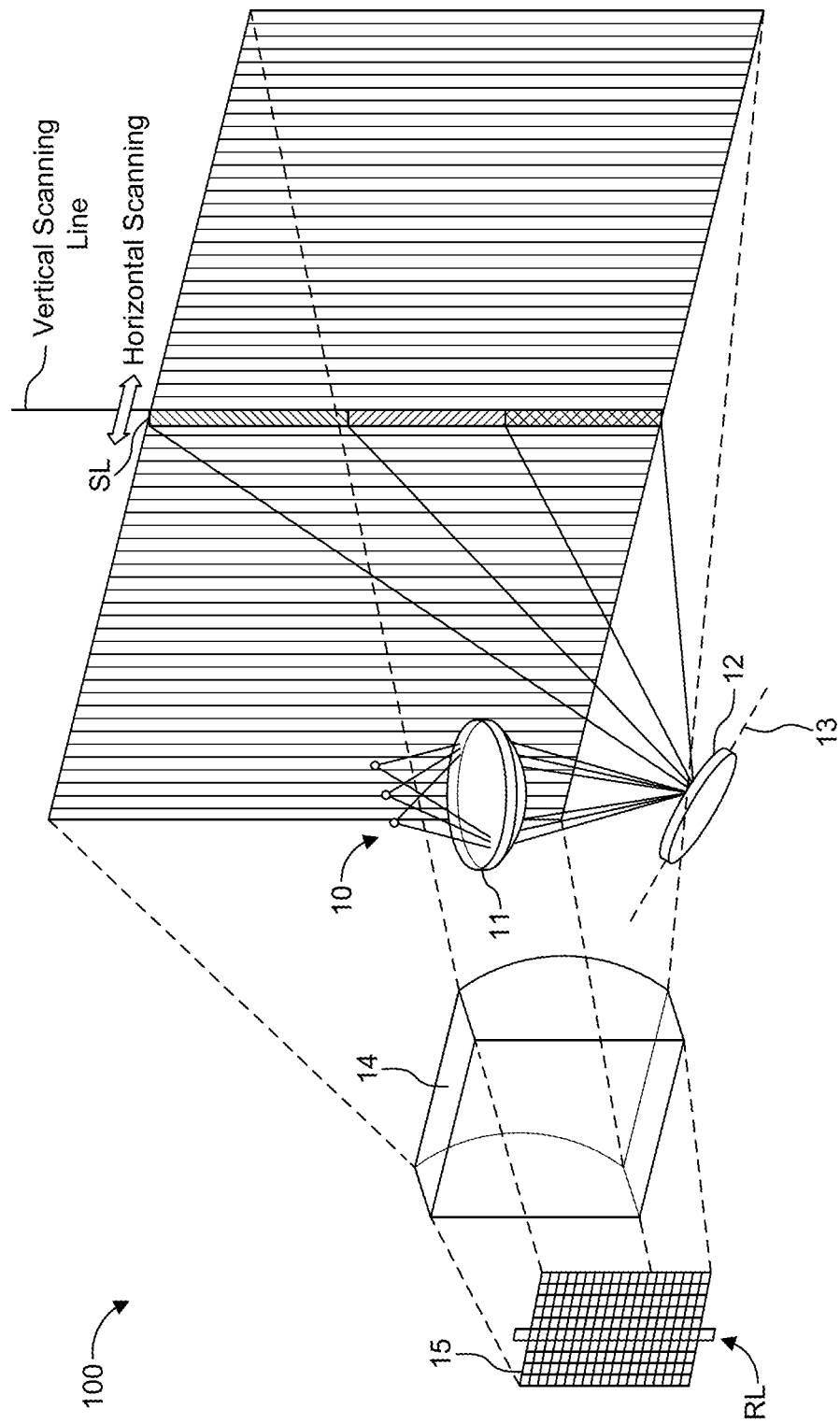
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a one-dimensional (1D) array that consists of multiple rows of photodetectors (pixels) arranged in a single column or a two-dimensional (2D) array that consists of multiple rows and columns of photodetectors arranged in a grid-like arrangement. Each pixel row or group of adjacent pixel rows may be readout as a measurement signal in the form of raw analog data. Each measurement signal may include data from a single pixel column or from two or more pixel column corresponding to the selected pixel row or rows.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance. In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15 but may alternatively be a 1D photodetector array. The receiver may further include receiver circuitry, such as data acquisition/readout circuitry and data processing circuitry, as will be further described according to FIG. 2.

While this arrangement represents one example of a type of LIDAR system, it will be appreciated that other types of LIDAR systems, such as those used in flash LIDAR, may also be used. Thus, the embodiments described herein are not limited to a particular type of light transmitter or TOF system and may be also applied to other types of TOF systems, including both those that use pulsed modulation or continuous wave modulation. Pulsed modulation, similar to the LIDAR technique described herein, measures distance to a 3D object by measuring the absolute time a light pulse takes to travel from a source into the 3D scene and back, after reflection. Continuous wave modulation uses continuous light waves instead of short light pulses and the modulation is done in terms of frequency of sinusoidal waves. For continuous wave modulation, a detected wave after reflection has shifted phase, and the phase shift is proportional to distance from reflecting surface. Thus, the distance can be determined from the measured phase shift. Thus, the embodiments described herein are related more generally to TOF systems and 3D imaging systems, and, more particularly, to receivers of those systems.

Turning back to FIG. 1, the photodetector array 15, whether it be a 2D array or a 1D array, is arranged in such a manner that an intended field of view is mapped vertically on the vertical extension of the photodetector array 15. A received light beam will hit only a specific row or group or rows of the detector array depending on the vertical angle of the received light beam. The intended field of view may be further mapped horizontally on the horizontal extension of a 2D photodetector array.

In this example, the illumination unit 10 includes three light sources (e.g., laser diodes or light emitting diodes) that are linearly aligned in single bar formation and are configured to transmit light used for scanning the field of view for objects. The light emitted by the light sources is typically infrared light although light with another wavelength might also be used. As can be seen in the embodiment of FIG. 1, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

While the transmission mirror is described in the context of a MEMS mirror, it will be appreciated that other 1D mirrors or even 2D mirrors can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis. LIDAR systems using 1D-scanning mirrors can use a more relaxed shot-rate of the illumination unit 10 (i.e., transmitter) compared to 2D-scanning mirrors which use laser points for scanning the field of view which requires more shots for the transmitter to scan a field of view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL.

In a system that uses a 1D photodetector array instead of a 2D photodetector array, each light beam (i.e., each receiving line RL) is projected onto the column of the detector array.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. As noted above, the photodetector array 15 may be a 1D array that includes a single column of photodiodes. The activation of the photodiodes may be synchronized with light pulses emitted by the illumination unit 10.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

The signal processing chain of the receiver may also include an ADC for each photodiode or for a group of photodiodes. The ADC is configured to convert the analog electrical signals from the photodiodes or group of photodiodes into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a vertical column of light that may, for example, have the width of one photodetector pixel and a length that spans vertically at least partially along a pixel column of the photodetector array 15 in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, two or more pixel columns may receive light from a same bar of light. For example, two pixel columns may receive light when a portion of the received bar of light impinges on an area between two photodetector pixels. In this case, two pixel columns may be partially illuminated by a single bar of light in the width direction.

On the other hand, if a partial vertical scanning line SL is generated by the illumination unit 10, as described above, then only a partial pixel column of the photodetector array 15 may be illuminated in a lengthwise direction.

The photodetector array 15 is configured to generate measurement signals (electrical signals) used for generating a 3D map of the environment based on the reflected light (e.g., via TOF calculations and processing). For example, as noted above, the photodetector array 15 may be a 2D array of photodiodes or other light detection component capable of detecting and measuring light, and generating electrical signals therefrom.

While not shown, the LIDAR scanning system 100 may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15. For example, the DMD would first receive the reflected light pulse from the primary optics, and deflect the received reflected light through the secondary optics (e.g., a lens, a total internal reflection (TIR) prism, or a beam splitter) onto the photodetector array 15. In this case, the photodetector array 15 would still receive a vertical column of light, as described above.

Figure 2:
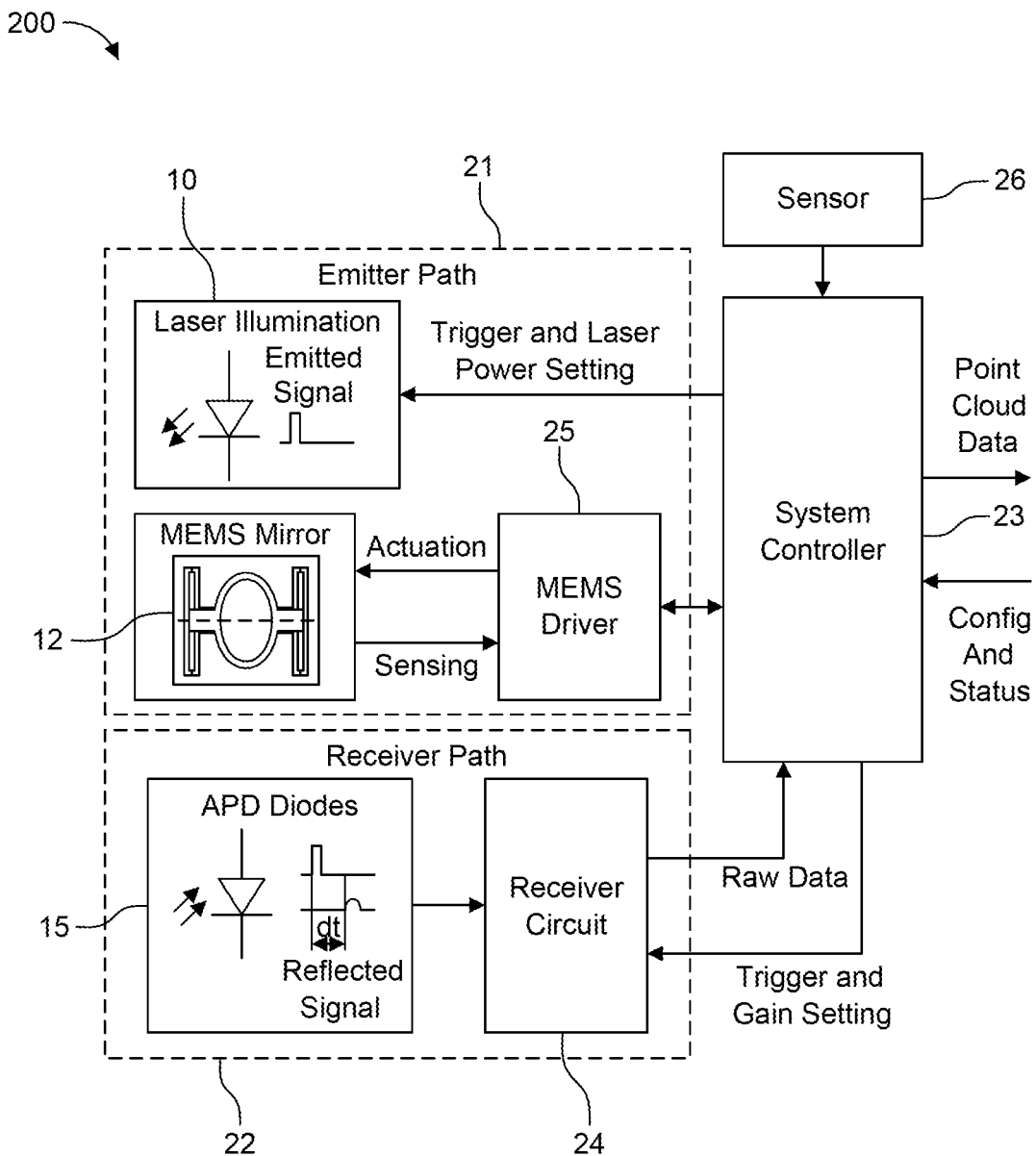
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The receiver unit 22 includes the photodetector array 15 as well as a receiver circuit 24 that includes an analog readout circuit. As will be described in more detail below, each row of the photodetector array 15 may be selectively coupled and decoupled by an analog multiplexer to the receiver circuit 24. A pixel, a row, or a column that is coupled to the receiver circuit 24 may be referred to as active, while a pixel, a row, or a column that is not coupled to the receiver circuit 24 may be referred to as inactive.

The analog readout circuit includes N analog output channels (e.g., 32 channels) configured to read out measurement signals received from a selected pixel of a coupled row of the photodetector array 15. Furthermore, more than one pixel from a coupled row may be selected, multiple rows may simultaneously be coupled to an output channel, and one or more pixels may be selected from each coupled row.

Thus, the receiver circuit 24 may receive the analog electrical signals from the photodetectors of the photodetector array 15 and transmit the electrical signals as raw analog data to an analog-to-digital converter (ADC). Prior to the ADC receiving the electrical signals, the electrical signals may pass through an amplifier (e.g., a transimpedance amplifier (TIA)) that converts the electrical signals from, for example, current into voltage. The ADC is configured to convert the raw analog data into raw digital data for further processing. The amplifier and/or the ADC may be incorporated in the system controller 23 or the receiver circuit 24, or may be interposed between the receiver circuit 24 and the system controller 23 as separate circuits.

The receiver circuit 24 may also receive trigger control signals from the system controller 23 that triggers an activation of one or more photodetectors. The receiver circuit 24 may also receive gain setting control signals for controlling the gain of one or more photodetectors.

The system controller 23 includes signal processing circuitry that receives the raw digital data as well as serial data of a differential time between start and stop digital signals generated by an ADC, and uses the received data to calculate time-of-flight information for each field position within the field of view, to generate object data (e.g., point cloud data), and to generate a 3D point cloud.

The electrical signal path from the photodetectors of the photodetector array 15 to the system controller 23 may be vulnerable to failures. These failures can occur in the optical components, including the pixels of the photodetector array 15, and in the signal processing elements arranged along the signal path from the photodetector array 15 output to the system controller 23. Embodiments provided herein provide protection and monitoring of the electrical signal path that extends from the photodetector array 15 to the system controller 23.

Figure 3:
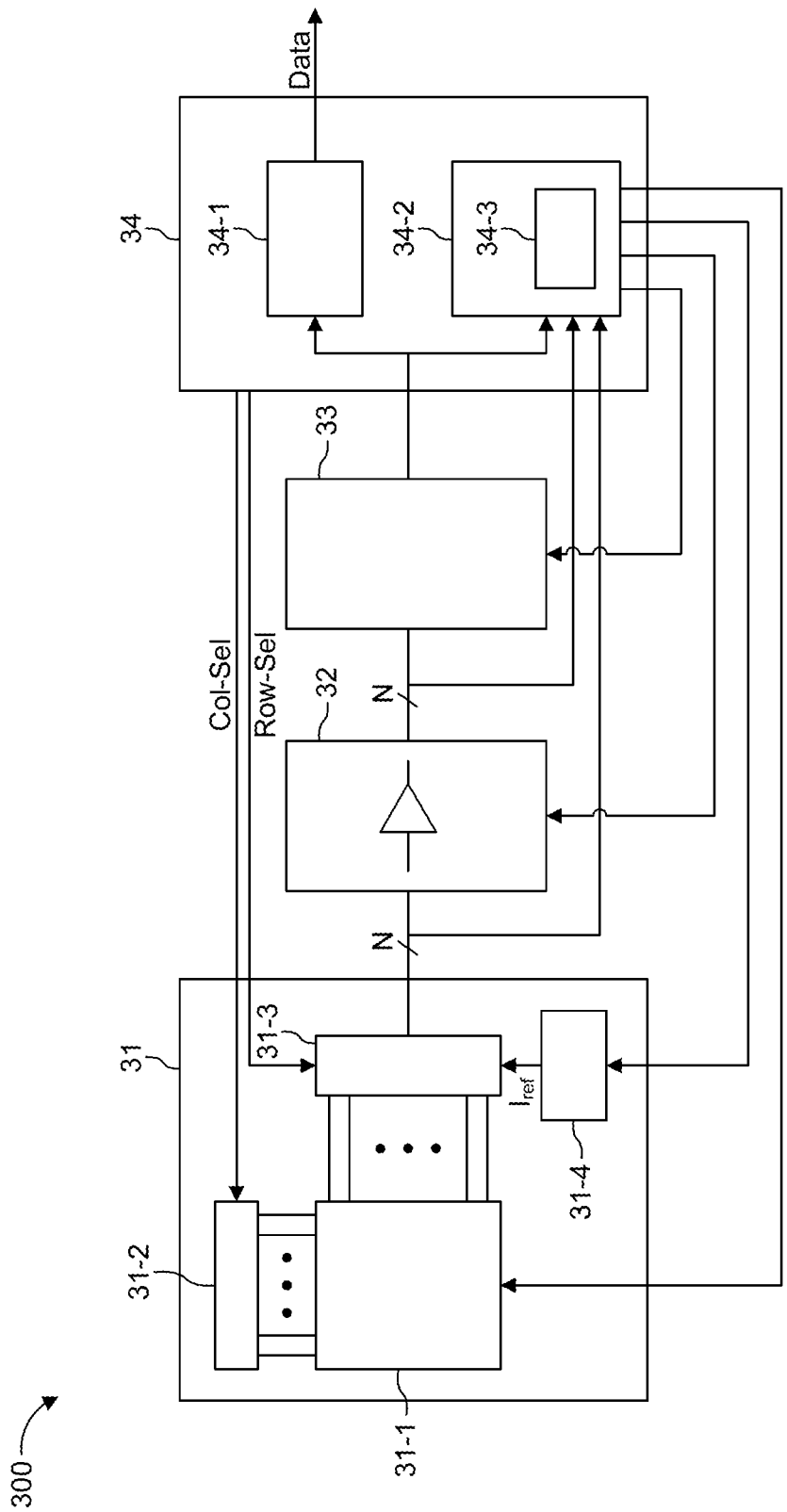
FIG. 3 is a schematic block diagram of a electrical signal path of a LIDAR receiver in accordance with one or more embodiments.

FIG. 3 is a schematic block diagram of a electrical signal path of a LIDAR receiver 300 in accordance with one or more embodiments. In particular, the electrical signal path of a LIDAR receiver 300 includes a photodetector circuit 31, a receiver circuit 32, a comparator circuit 33, and a system controller 34. Each element 31-34 may be arranged on a separate integrated circuit (IC) or combined with one or more of the other circuits on a same IC.

The photodetector circuit 31 includes a 2D photodetector array 31-1, a decoder 31-2, an analog multiplexer (mux) 31-3, and a reference signal generator 31-4. In this example, the photodetector array is a 2D photodetector array with 96 columns and 128 rows but is not limited thereto. A particular column may be enabled when it is receiving light (i.e., synchronized according to a firing direction of the laser by the transmitter). This helps to reduce noise of ambient light. The decoder 31-2 receives a column select information Col_Sel from the system controller 34 indicating which column or columns to enable, and the decoder 31-2 enables the corresponding column or columns.

The analog multiplexer 31-3 is configured to receive and route analog signals and is further configured to select which rows from the photodetector array 31-1 to output from the photodetector circuit 31. That is, the analog multiplexer includes a number N of readout channels (e.g., 32 readout channels) that are fewer than the number of rows of the photodetector array 31-1. The analog multiplexer 31-3 receives row select information Row_Sel from the system controller 34 indicating which row or rows to route to a particular readout channel, and the analog multiplexer 31-3 routes the corresponding row or rows accordingly. The analog multiplexer 31-3 includes readout elements, coupled to the readout channels, that selectively read out or output an analog signal received from one or more adjacent rows of the photodetector array 31-1 to the next stage of the receiver signal path. In this way, each photodetector pixel of the photodetector array 31-1 can be individually selected by column (via the decoder) and by row (via the analog multiplexer) for output to one of the readout channels.

In addition, the input or the output of each readout channel of the analog multiplexer 31-3 may receive injected reference signals provided by the reference signal generator 31-4. The reference signal generator 31-4 may be a programmable current source that behaves like a virtual pixel column input into the analog multiplexer 31-3, much like an actual pixel column of the photodetector array 31-1. That is, the reference signal generator 31-4 may inject one or more reference signals Iref into the output paths of the photodetector array 31-1 and the analog multiplexer 31-3 may select which row or adjacent rows carrying the reference signals are routed to a specific readout channel. When multiple adjacent rows are routed to a single readout channel, the signals of those rows are summed together by the readout elements of the analog multiplexer 31-3 by, for example, averaging, and the combined signal is read out by the analog multiplexer at the appropriate channel.

The reference signal generator 31-4 may be coupled as early in the signal path as possible (e.g., as close to the photodetector array as possible) so that the reference signals pass though as many circuit elements as possible. Alternatively, the reference signals may be injected directly into a column of the photodetector array 31-1, and selectively read out via the analog multiplexer 31-3.

The reference signals may be injected in lieu of electrical signals generated by the photodetector array (i.e., during a first time interval) or in combination with electrical signals generated by the photodetector array (i.e., during a second time interval). A plurality of first time intervals may be interleaved with a plurality of second time intervals, and the reference signals may be injected only during the first time intervals, only during the second time intervals, or during both the first and the second time intervals. The first time intervals may correspond to a first operating mode of the LIDAR system and the second time intervals may correspond to a second operating mode of the LIDAR system.

Thus, the injected reference signals may be combined with the analog data signal received from one or more rows of the photodetector array or they may be injected while the photodetector array is not taking a measurement without an analog data signal being provided by the photodetector array. Again, this may be achieved by injecting the reference signal at the analog multiplexer or at the photodetector array.

Each injected reference signal may be a current pulse with known characteristics, including known height (amplitude), length (width), rise-time, fall-time, shape, etc. For example, the reference signal can be either a simple current pulse, a more complex current pulse, or a combination of current pulses of same or different height (amplitude), length (width), rise-times, fall-times, shape, etc. Different pulse patterns, including one or more signal pulses, may be stored in memory as pulse pattern information, and a pulse pattern may be selected by a selection element (e.g., a state machine or a processor) according to one or more inputs.

For example, a memory table may store different pulse shapes and patterns as pulse pattern information, and a state machine may select a pulse pattern from the table to inject based on external inputs. The selected pulse pattern may be provided to the reference signal generator 31-4, which may be a programmable reference signal source, and the reference signal generator 31-4 may generate at least one reference signal according to the selected pulse pattern. Additionally, one of the pulse patterns may be selected randomly by the selection element, or the selection element may create a random pulse pattern based on an external input and provide the random pulse pattern to the reference signal generator 31-4 such that the reference signal generator 31-4 is configured to generate the random pulse pattern for at least one reference signal.

The correct routing of each injected reference signal to the desired channel of the electrical signal path is performed by channel multiplexing at the analog multiplexer 31-3. Channel cross-talk is prevented by injecting the reference signals of each channel separately (e.g., time shifting). Thus, adjacent channels are time shifted with respect to one another by, for example, the reference signal generator 31-4 and the analog multiplexer 31-3, to prevent interference caused by injecting a reference signal in adjacent channels at the same time.

The receiver circuit 32 includes an array of amplifiers, e.g., TIAs, one for each channel. A TIA is a current to voltage converter that converts the current analog signals of a corresponding channel received from the photodetector circuit 31 into voltage signals. Thus, each channel includes a TIA that performs this conversion. Each TIA may further amplify and filter the electrical signal. Each voltage signal is then routed along a corresponding channel to an ADC circuit 33. These voltage signals, whether they be derived from electrical signals generated by the photodetector array 31-1 or from reference signals generated by the reference signal generator 31-4, may be referred to as processed signals. In addition, the reference signal generator 31-4 may be implemented in the receiver circuit 32 instead of in the photodetector circuit 31.

The ADC circuit 33 includes an array of ADCs, one for each channel, that are configured to detect the analog voltage signals output from the receiver circuit 32 for ToF measurements, as well as to digitize the analog voltage signals. The digitized voltage signals, whether they be derived from electrical signals generated by the photodetector array 31-1 or from reference signals generated by the reference signal generator 31-4, may also be referred to as processed signals or as further processed signals. The ADC circuit 33 provides these processed signals to the system controller 34 via one or more signal channels for further processing, for example, to generate 3D point cloud data.

The system controller 34 includes features that are similar to the system controller 25 described above. Thus, the system controller 34 includes signal processing circuitry and control circuitry. In particular, the system controller 34 includes a signal processing unit 34-1 and a control unit 34-2. The system controller 34 may be implemented on a field programmable logic array (FPGA), a microcontroller, or a combination of a FPGA and a microcontroller.

The signal processing unit 34-1 is configured to receive processed electrical signals derived from the electrical signals generated by the photodetector array 31-1, and generate 3D point cloud data therefrom.

The control 34-2 unit is configured to generate various control signals, such as the column selection information Col_Sel, the row selection information Row_Sel, signal path configuration information (e.g., to modify a gain setting of one or more circuit elements along the signal path), external inputs used to select a pulse pattern, etc. The control unit 34-2 also includes an evaluation circuit 34-3 coupled to the signal path and configured to evaluate one or more signal extraction points along the signal path. Thus, the evaluation circuit 34-3 may be coupled to the plurality of signal channels at various points along the signal path for receiving signals (e.g., processed reference signals or processed combined signals) therefrom.

Extraction points may be located at any point along the signal path, but may include an output of the photodetector circuit 31, an output of the receiver circuit 32, and an output of the ADC circuit 33. Extraction points may also be internal to the aforementioned circuits 31-33. In addition, one or more signal channels at each extraction point may be evaluated. The evaluation circuit 34-3 may select an extraction point and any one of the signal channels at the selected extraction point for receiving a signal therefrom.

The evaluation circuit 34-3 is configured to receive processed reference signals or processed combined signals from one or more signal channels along the signal path. Processed reference signals are reference signal generated by the signal reference generator 31-4 that are subsequently processed by a circuit element on the signal path. The combined signals are signals that are a combination of at least one reference signal generated by the signal reference generator 31-4 and at least one electrical signal generated by the photodetector array 31-1, and processed combined signals are combined signals that are processed by a circuit element on the signal path.

The evaluation circuit 34-3 is further configured to compare a processed reference signal to an expected result to generate a comparison result. Each signal channel may provide a different processed reference signal, and each processed reference signal may be compared to an expected result corresponding to that signal channel. The expected result takes into account all anticipated processing performed on a reference signal by circuit elements located upstream from the extraction point. An expected result is stored in memory at the evaluation circuit 34-3 and represents an expected output of a reference signal at an extraction point when processed by one or more circuit elements along the signal path. The expected output may consider gain, cut-off frequency, group delay, signal distortion, noise level, and other properties. An expected result corresponds to both the type of injected reference signal (i.e., the pulse pattern of the reference signal) and the point of extraction in the signal path. The expected result may also be specific to a particular signal channel of the signal path which includes specific circuit elements.

The evaluation circuit 34-3 is further configured to evaluate at least one characteristic (e.g., gain, cut-off frequency, group delay, signal distortion, noise level, and other properties) of the signal path or one or more of the signal channels based on the comparison results, and determine whether the quality of the signal path is within an acceptable tolerance range for safely operating the LIDAR system. If the quality of the signal path is within the acceptable tolerance range, circuit elements in the signal path are determined to be operating normally, within set safety parameters. However, if the quality of the signal path is outside the acceptable tolerance range, the evaluation circuit 34-3 determines that there may be a fault or degradation along the signal path and further action is taken.

For example, the evaluation circuit 34-3 may perform further diagnostics on the signal path to determine a location of the fault or the degradation. Further reference signals may be generated and evaluated at different extraction points such that the evaluation circuit 34-3 can localize the fault or the degradation. In this case, the evaluation circuit 34-3 may evaluate different extraction points sequentially upstream until the fault or the degradation is no longer present.

A circuit element that is downstream from the non-fault extraction point may be determined as a source of the fault. If a non-fault is not realized during localization, the source of the fault may be the circuit element furthest upstream (i.e., the photodetector array 31-1), which does not have an extraction point upstream therefrom. Alternatively, two extraction points may be evaluated and the results analyzed. A circuit element that is between an extraction point at which there is non-fault and an extraction points at which there is a fault, for example, may be determined as a source of the fault.

Depending on the origin of the fault/degradation of the signal path, the control 34-2 unit determines a response, which may include at least one of: putting a higher priority on other object scanning sensors (e.g., camera sensors or radar sensors) when merging the sensor data for object detection (i.e., lowering a priority of the LIDAR sensor relative to another object scanning sensor), continuing the operation of the LIDAR sensor with reduced performance in terms of field-of-view and/or range, or disabling the LIDAR sensor altogether and informing the operator of the vehicle.

In addition to evaluating processed reference signal, the evaluation circuit 34-3 is further configured to compare a processed combined signal to an expected result to generate a comparison result. The evaluation circuit 34-3 may perform this evaluation in a similar manner described above for processed references signals. Thus, each processed combined signal may be compared to an expected result corresponding to a signal channel. The expected result takes into account all anticipated processing performed on a combined signal by circuit elements located upstream from the extraction point. An expected result is stored in memory at the evaluation circuit 34-3 and represents an expected output of a combined signal, or a reference signal extracted therefrom, at an extraction point when processed by one or more circuit elements along the signal path.

The evaluation circuit 34-3 is further configured to evaluate at least one characteristic (e.g., gain, cut-off frequency, group delay, signal distortion, noise level, and other properties) of the signal path or one or more of the signal channels based on the comparison results, and determine whether the quality of the signal path is within an acceptable tolerance range for safely operating the LIDAR system. The evaluation circuit 34-3 may further perform further diagnostics on the signal path to determine a location of the fault or the degradation.

With this approach random faults and degradation of the entire signal path can be effectively detected and can be integrated it into the system operation during run-time. Specifically, the control unit 34-2 may provide a safety mechanism for the receiver signal path by checking for any degradation of the functionality of the receiver components arranged along the signal path. The monitoring can be operated periodically within the fault tolerant time interval or once per driving cycle of a vehicle (i.e., once between power-up and power-down of the vehicle during operation of the vehicle).

Figure 4:
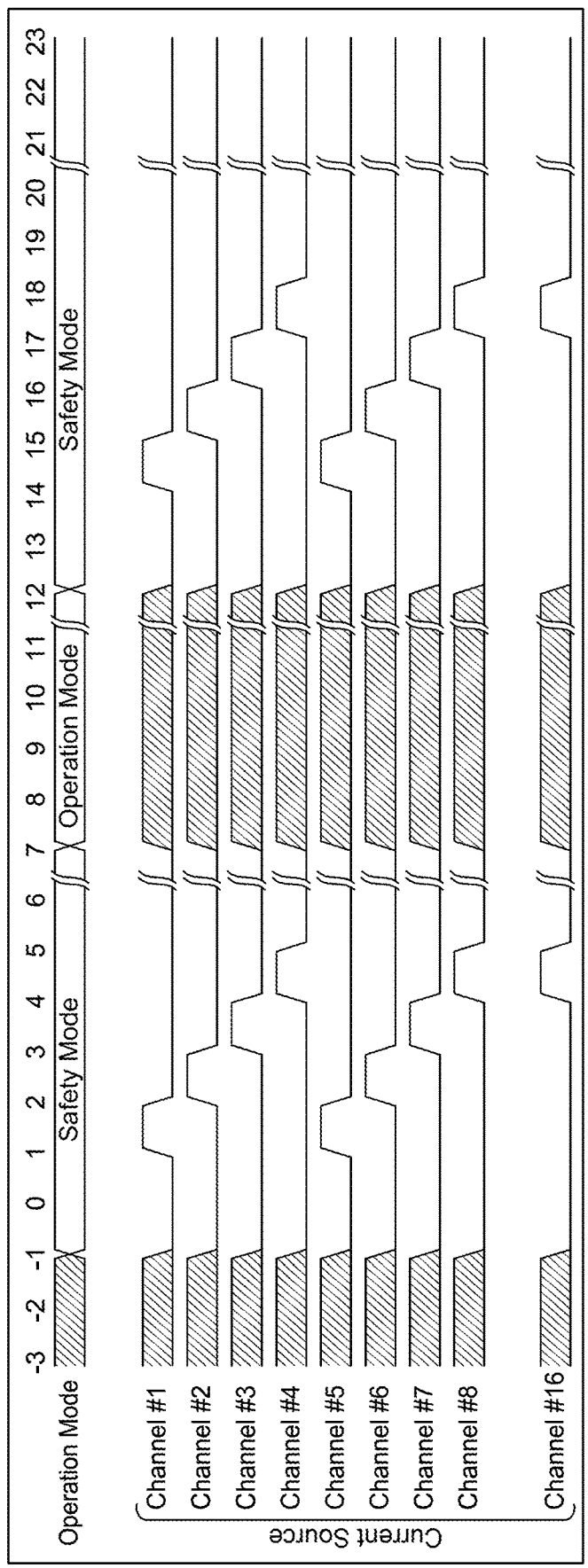
FIG. 4 is a signal diagram of a plurality of signal channels implemented in a LIDAR system into which reference signals are injected in accordance with one or more embodiments.

FIG. 4 is a signal diagram of a plurality of signal channels implemented in a LIDAR system into which reference signals are injected in accordance with one or more embodiments. The reference signals are represented by simple signal pulses in this example, but could be replaced by different pulse patterns. The LIDAR system is configured to operate in two operation modes: a safety mode and an operation mode.

The operation mode is represented by a plurality of first time intervals are interleaved with the safety mode represented of a plurality of second time intervals. During the safety mode, the photodetector array is not providing signals to the signal path. The safety mode occurs between two light acquisition periods of the LIDAR system. In this case, the evaluation circuit 34-3 receives processed reference signals from the signal path. Thus, the reference signal generator 31-4 is configured to inject the plurality of reference signals between two light acquisition periods of the LIDAR system.

In contrast, during operation mode, the photodetector array 31-1 configured to generate electrical signals based on received light. In this case, an evaluation of the signal path may not be performed. In the event that the evaluation circuit 34-3 does not perform an evaluation during the operation mode, reference signals are not injected into the signal path.

Alternatively, an evaluation of the signal path may be performed during an operation mode. In this case, the evaluation circuit 34-3 configures the reference signal generator 31-4 to inject reference signals into the signal channels. As a result, the reference signal generator 31-4 is configured to inject the plurality of reference signals during a light acquisition period of the LIDAR system. Here, the evaluation circuit 34-3 receives processed combined signals from the signal path.

The reference signal generator 31-4 and the analog multiplexer 31-3 may, together, be controlled to implement a time shift of the plurality of reference signals such that adjacent channels of the plurality of signal channels receive corresponding reference signals of the plurality of reference signals at different times. For example, as shown in FIG. 4, a reference signal is injected into channel 2 time shifted relative to reference signals injected into its adjacent channels, channels 1 and 3.

Figure 5B:
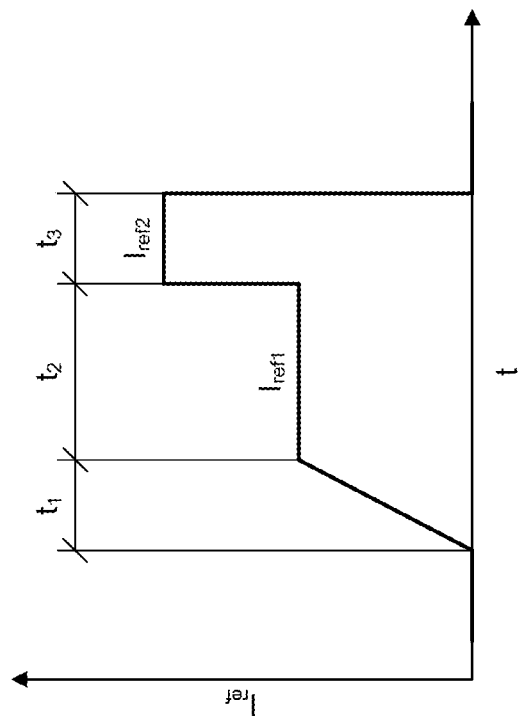
FIGS. 5A and 5B are reference signal diagrams of example pulse patterns in accordance with one or more embodiments.
Figure 5A:
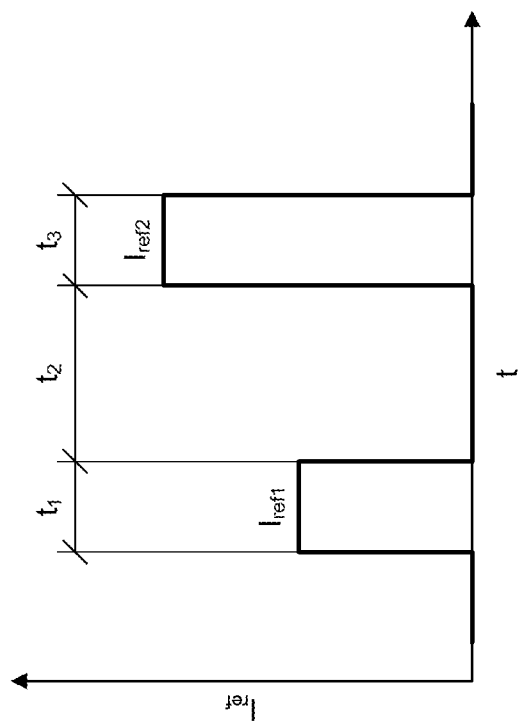

FIGS. 5A and 5B are reference signal diagrams of example pulse patterns in accordance with one or more embodiments. The pulse patterns have different height (amplitude), length (width), rise-times, fall-times, shape, etc., that may be used for different reference signals selected by a selection element. In this case, the pulse patterns are made up of current pulses $I_{ref1}$ and $I_{ref2}$.

Thus, in view of FIGS. 4, 5A, and 5B, the control unit 34-2 may configure the reference signal generator 31-4 and the analog multiplexer 31-3 to implement a diversity in testing in both time (via time shifting) and/or pulse patterns. That is, even different pulse patterns may be injected into adjacent channels in addition to the pulse patterns being time shifted from each other so that little or no overlap occurs in adjacent channels in terms of receiving reference signals.

Figure 6:
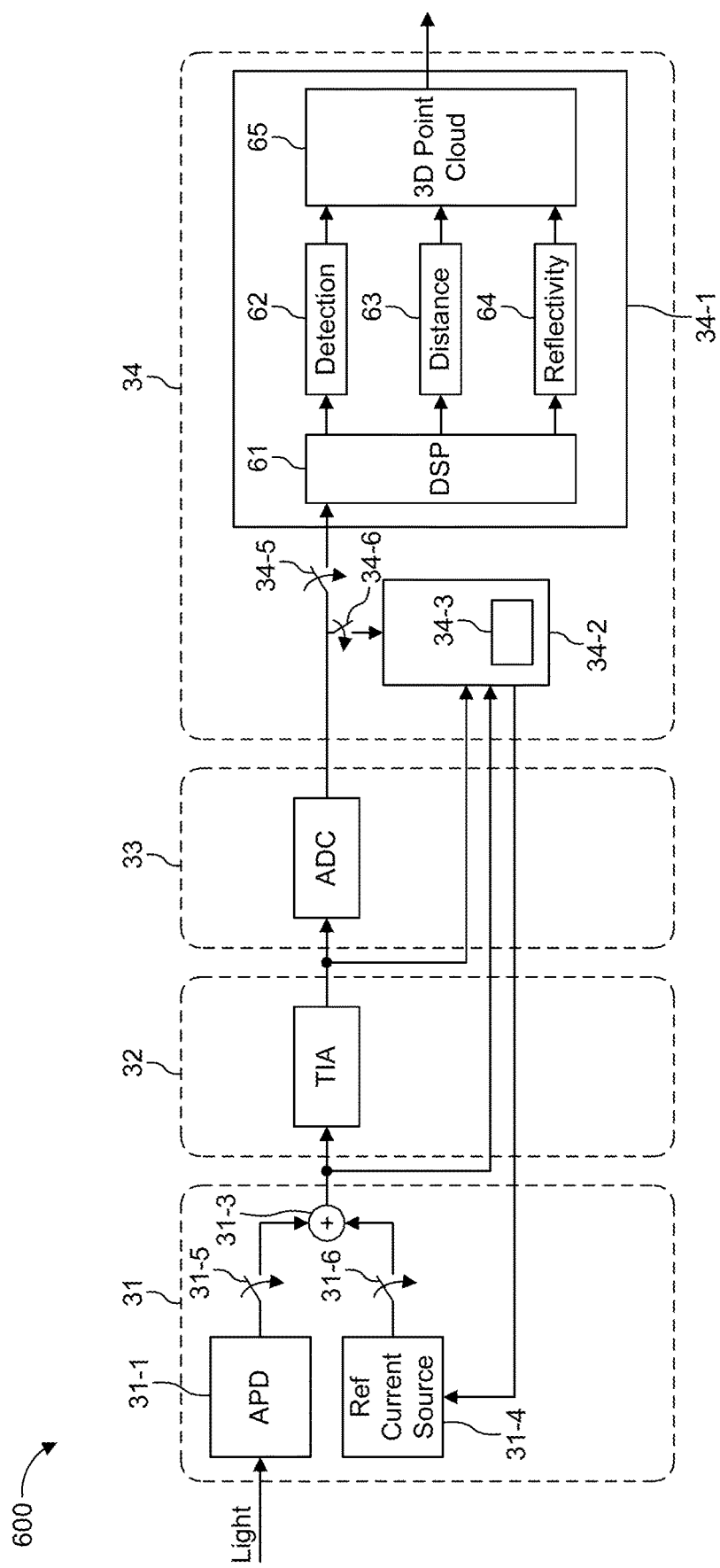
FIG. 6 is a schematic block diagram of a electrical signal path of a LIDAR receiver in accordance with one or more embodiments.

FIG. 6 is a schematic block diagram of a electrical signal path of a LIDAR receiver 600 in accordance with one or more embodiments. In particular, the electrical signal path of a LIDAR receiver 600 is similar to the electrical signal path of the LIDAR receiver 300 shown in FIG. 3. However, in this example, the LIDAR receiver 600 is configured to evaluate the signal path during the safety mode only. In this case, normal operation of transmitting and receiving light pulses may be stopped for a predetermined amount of time (i.e., for a second time interval) such that a safety evaluation is performed.

The photodetector circuit 31 further includes two switches: switch 31-5, coupled between the photodetector array 31-1 and the analog mux 31-3, and switch 31-6, coupled between the reference signal generator 31-4 and the analog mux 31-3. Switches 31-5 and 31-6 are complementary switches, meaning that when one is closed the other is open. Thus, only one signal path from either the photodetector array 31-1 or the reference signal generator 31-4 is coupled to the analog mux 31-3 at a time. More specifically, the switch 31-5 is closed when the LIDAR system is operating in operation mode to provide electrical signals from the photodetector array 31-1. Moreover, the switch 31-6 is closed when the LIDAR system is operating in safety mode to provide reference signals from the reference signal generator 31-4.

The photodetector circuit 31 further includes two switches: switch 31-5, coupled between the photodetector array 31-1 and the analog mux 31-3, and switch 31-6, coupled between the reference signal generator 31-4 and the analog mux 31-3. Switches 31-5 and 31-6 are complementary switches, meaning that when one is closed the other is open.

The system controller 34 also includes two switches: switch 34-5, coupled between the input of the system controller 34 and the signal processing unit 34-1, and switch 34-6, coupled between the input of the system controller 34 and the control unit 34-2. Switches 34-5 and 34-6 are complementary switches, meaning that when one is closed the other is open. Thus, only one signal path from the input to either the signal processing unit 34-1 or the control unit 34-2 is connected at a time. More specifically, the switch 34-5 is closed when the LIDAR system is operating in operation mode to provide processed electrical signals, derived from the photodetector array 31-1, to the signal processing unit 34-1. Moreover, the switch 31-6 is closed when the LIDAR system is operating in safety mode to provide processed reference signals, derived from the reference signal generator 31-4, to the control unit 34-2 and more specifically to the evaluation circuit 34-3. Thus, the reference signals can be injected into the signal path and the evaluation circuit 34-3 can check the signal channels at various extraction points.

The signal processing unit 34-1 includes a DSP 61 configured to process the processed electrical signals (i.e., sensor data), an object detection unit 62 configured to detect objects in the sensor data, a distance determination unit 63 configured determine a distance of each detected object (ranging), a reflectivity unit 64 configured to determine a reflectivity of each detected object, and a 3D point cloud unit 65 configured to generate 3D point cloud data from the detected objects, determined object distances, and the determined object reflectivities.

Figure 7:
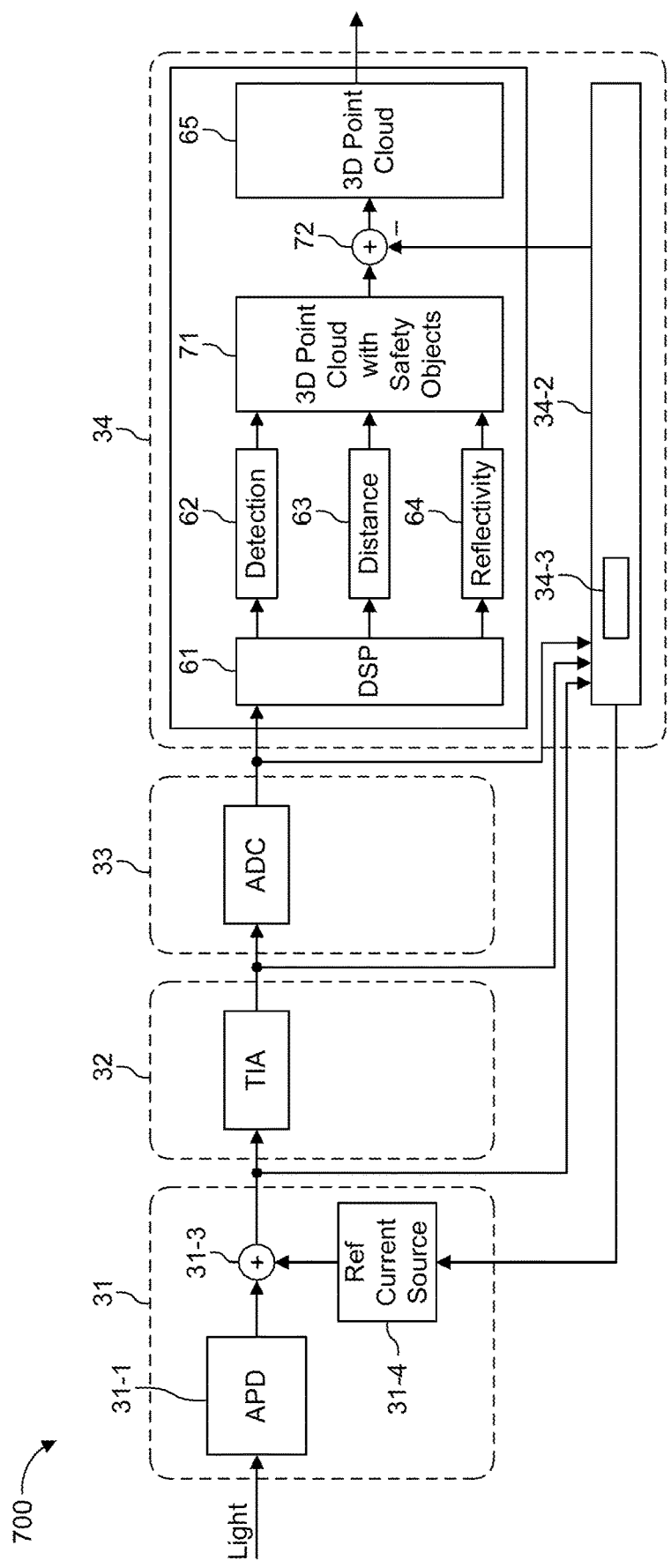
FIG. 7 is a schematic block diagram of a electrical signal path of a LIDAR receiver in accordance with one or more embodiments.

FIG. 7 is a schematic block diagram of a electrical signal path of a LIDAR receiver 700 in accordance with one or more embodiments. In particular, the electrical signal path of a LIDAR receiver 700 is similar to the electrical signal path of the LIDAR receiver 600 shown in FIG. 6. However, in this example, the LIDAR receiver 700 is configured to evaluate the signal path during the safety mode and/or during the operation mode. In this example, the evaluation of the signal path is performed on object level.

In particular, the control unit 34-2 is configured to select one or more pulse patterns or a virtual object to inject into the signal path, where the virtual object is placed at a certain virtual location in the point cloud at a fixed virtual distance. In other words, the virtual object is formulated as if it was detected by the photodetector array 31-1 from light reflecting off an object in the field of view and inserted into the signal path to simulate a real object. The virtual objects should be small such that coinciding real objects are not obfuscated.

The control unit 34-2 may control the reference signal generator 31-4 and the analog multiplexer 31-3 such that the reference signal generator 31-4 generates reference signals representative of the virtual object and its distance, and such that the analog multiplexer 31-3 routes the reference signals to one or more signal channels representative of the object location. A virtual object may be injected into the signal path during either the safety mode or the operation mode. In the latter case, the virtual object would be combined with the electrical signals (sensor data) generated by the photodetector array 31-1.

Post processing performed by the signal processing unit 34-1 ensures that the virtual object inserted into the sensor data is detected at an expected location and removed from the point cloud data. Thus, the signal processing unit 34-1 further includes a preliminary 3D point cloud unit 71 that generates preliminary 3D point cloud data from the detected objects, determined object distances (ranging), and the determined object reflectivities, which include information from any virtual objects injected via the reference signals.

The signal processing unit 34-1 further includes a filter 72 that receives virtual object data from the control unit 34-2 and preliminary 3D point cloud data from the preliminary 3D point cloud unit 71, and removes the virtual object data from the preliminary 3D point cloud data to generate actual 3D point cloud data. The 3D point cloud unit 65 finalizes the 3D point cloud data. Thus, the evaluation of the signal path can be performed by the evaluation circuit 34-3 during run-time of the LIDAR sensor.

Figure 8:
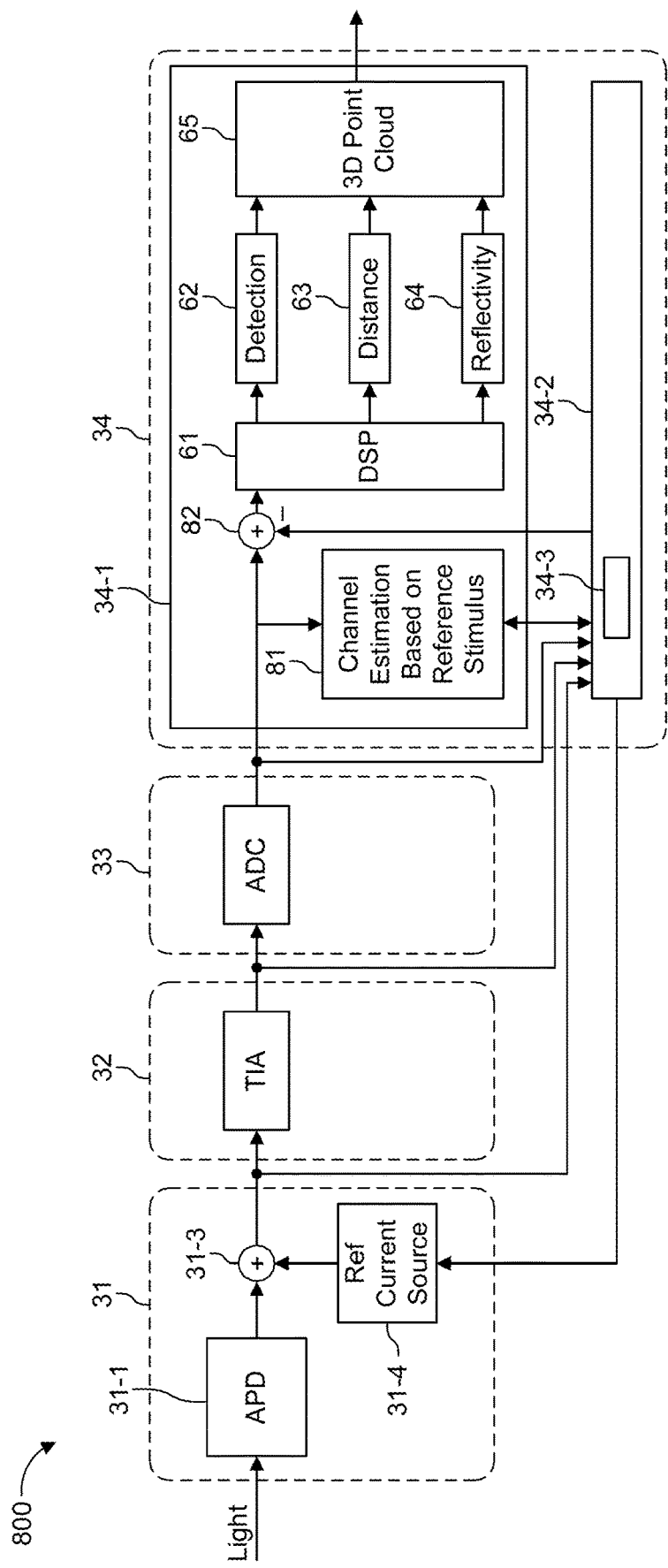
FIG. 8 is a schematic block diagram of a electrical signal path of a LIDAR receiver in accordance with one or more embodiments.

FIG. 8 is a schematic block diagram of a electrical signal path of a LIDAR receiver 800 in accordance with one or more embodiments. In particular, the electrical signal path of a LIDAR receiver 800 is similar to the electrical signal path of the LIDAR receivers 600 and 700 shown in FIGS. 6 and 7, respectively. However, in this example, the LIDAR receiver 800 is configured to evaluate the signal path during the safety mode and/or during the operation mode on a pulse level. That is, the comparison to the reference signal and the removal is performed on the physical level (e.g., performed on ADC data or processed ADC data).

The control unit 34-2 is configured to select one or more pulse patterns or a virtual object to inject into the signal path is a similar manner described above in reference to FIG. 7. However, at the system controller 34, the injected references signals are removed (i.e., filtered out) from the processed combined signal prior to generating point cloud data.

The reference signals (i.e., pulses) injected into the signal path may not necessarily model a virtual object, as they did in FIG. 7, but they are designed to optimally identify a signal channel. In post processing at the system controller 34, the pulses are used to extract the channel characteristics (which are checked to be within the limits as per functional safety) via channel estimator 81 and the pulses are removed from the processed combined signal by a filter 82. As a result, only processed electrical signals derived from the electrical signals of the photodetector array 31-1 remain in the signal path and are input into the DSP 61 for the generation of 3D point cloud data.

The channel estimator 81 is configured to receive processed combined signals and estimate one or more channel characteristics of one or more signal channels based on known properties of a reference signal injected into the signal channel (i.e., based on reference stimulus), the know properties being received from the evaluation circuit 34-3. The channel estimator 81 is configured to provide the estimated channel characteristics to the evaluation circuit 34-3, which then compares the estimated channel characteristics to expected channel characteristic. Based on this comparison result, the evaluation circuit 34-3 determines whether a particular signal channel is functionally compliant with set guidelines.

Figure 9:
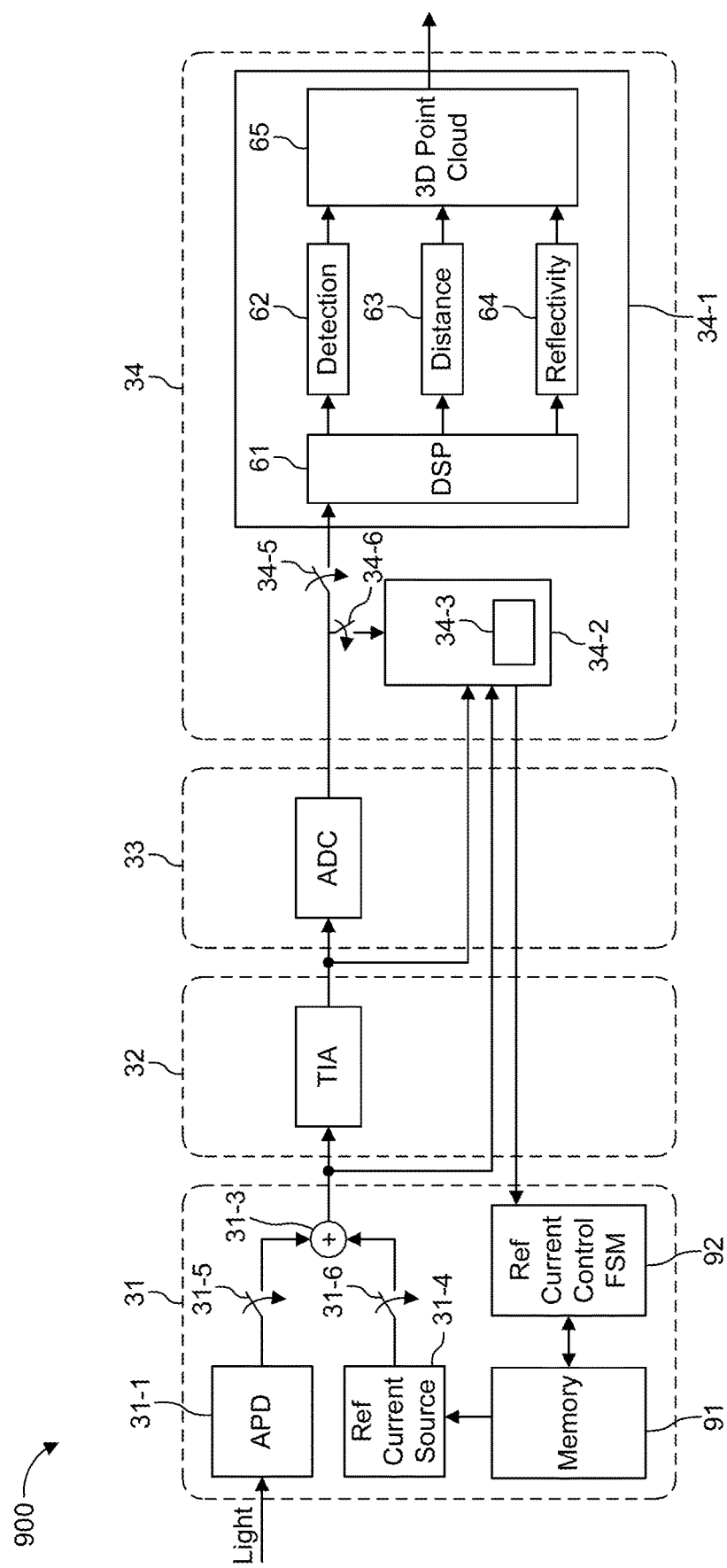
FIG. 9 is a schematic block diagram of a electrical signal path of a LIDAR receiver in accordance with one or more embodiments.

FIG. 9 is a schematic block diagram of a electrical signal path of a LIDAR receiver 900 in accordance with one or more embodiments. In particular, the electrical signal path of a LIDAR receiver 900 is similar to the electrical signal path of the LIDAR receiver 600 shown in FIG. 6. However, in this example, the LIDAR receiver 900 is configured to evaluate the signal path during the safety mode and/or during the operation mode. In this example, the evaluation of the signal path is performed on object level.

FIG. 9 is a schematic block diagram of a electrical signal path of a LIDAR receiver 900 in accordance with one or more embodiments. In particular, the electrical signal path of a LIDAR receiver 900 is similar to the electrical signal path of the LIDAR receiver 600 shown in FIG. 6. However, in this example, the LIDAR receiver 900 is additionally configured to select from a plurality of different pulse patterns for injecting into one or more signal channels of the signal path. It will be further appreciated that this scheme, as similarly discussed in reference to FIGS. 3, 4, 5A, and 5B, may also be implemented in the LIDAR receivers shown in FIGS. 7 and 8.

The photodetector circuit 31 includes a memory device 91 configured to store pulse pattern information corresponding to a plurality of different current pulse patterns. This may be accomplished, for example, by using a memory table (e.g., a look-up table) that stores the pulse pattern information corresponding to the plurality of different pulse patterns.

The photodetector circuit 31 further includes a selection element 92 configured to select one of the plurality of different pulse patterns and to control the reference current source 31-4 to generate at least one of the plurality of reference signals based on the selected one of the plurality of different pulse patterns. In particular, the selection element 92 may be a finite state machine or a processor configured to receive configuration information from the control unit 34-2. The finite state machine may select a state based on the received configuration information. The memory device 91 is configured to select one of the pulse patterns that corresponds to the state of the state machine, selectively output pulse pattern information corresponding to the selected pulse pattern, and provide this pulse pattern information to the reference signal generator 31-4. In other words, each pulse pattern may be mapped to a one more states of the state machine via the memory table. In turn, the reference signal generator 31-4 generates references signals according to the pulse pattern information received from the memory device 91.

This scheme may be used to mimic an output of the photodetector array 31-1 as well as to test characteristics of one or more signal channels or to test a response to various signal path configurations. For example, some pulse patterns may be adapted to and better suited for testing certain characteristics or conditions of the signal path than others. Similarly, some pulse patterns may be adapted to and better suited for testing certain configurations of the signal path than others. Thus, the selection element 92 may be used to select certain pulse patterns based on configuration information received from the control unit 34-2, where the configuration information corresponds to a condition, a characteristic, or a configuration to be tested.

In one example, the control unit 34 may be configured to modify a signal path configuration (i.e., to modify a setting of one or more circuit elements along the signal path). For example, the control unit 34 may modify a gain setting of the photodetector array 31-1, the TIAs of receiver circuit 32, and the ADCs of ADC circuit 33. The selection element 92 may receive signal path configuration information from the control unit 34 related to the gain setting, and select a state based on the configuration information. Thus, the selection element 92 and the memory device 91, as a whole, select one of the plurality of different pulse patterns based on the configuration of the signal path.

For a first gain setting, the selection element 92 and the memory device 91 are configured to select a first one of the plurality of different current pulse patterns. For a second gain setting, the selection element 92 and the memory device 91 are configured to select a second one of the plurality of different current pulse patterns, and so on. In the case that the first gain setting is larger than the second gain setting, and the first one of the plurality of different current pulse patterns may have a smaller amplitude than an amplitude of the second one of the plurality of different current pulse patterns.

Thus, the control unit 34-2 may provide a safety mechanism for the receiver signal path by checking for any degradation of the functionality of the receiver components arranged along the signal path. In this way, a signal from a single pixel row path can be checked or a signal from multiple pixels row paths combined at the analog multiplexer 31-3 can be checked. In order to help guarantee system performance, pulses can be monitored for any disturbance in the signal path, and characteristics of each signal channel can be monitored to ensure they do not change or drift over time. The evaluation circuit 34-3 may initially characterize the signal channels based on a reference signal to generate a model of expected results of each channel, store the model of expected results in memory, and then use the reference signal again to check for any variation against the expected result. The expected result takes into account one or more of gain, group delay, signal distortion, noise level, cut-off frequency, and other properties.

Although embodiments described herein relate to a MEMS device with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A time-of-flight light detection system, comprising:
   a plurality of circuits arranged sequentially along a signal path that comprises a plurality of signal channels, the plurality of circuits comprising a first circuit and a second circuit arranged downstream along the signal path from the first circuit;
   a reference signal source configured to generate a plurality of reference signals, wherein each of the plurality of signal channels at the first circuit receives at least one of the plurality of reference signals; and
   an evaluation circuit comprising at least one processor, the evaluation circuit coupled to the plurality of signal channels to receive a processed reference signal from the signal path, the evaluation circuit further configured to compare the processed reference signal to a first expected result to generate a first comparison result,
   wherein:
   the first circuit is coupled to the plurality of signal channels and includes a first plurality of inputs corresponding to the plurality of signal channels and a first plurality of outputs corresponding to the plurality of signal channels,
   the second circuit is coupled to the plurality of signal channels and includes a second plurality of inputs corresponding to the plurality of signal channels and a second plurality of outputs corresponding to the plurality of signal channels, and
   each of the first plurality of outputs is coupled to a respective one of the second plurality of inputs by a respective one of the plurality of signal channels.

2. The time-of-flight light detection system of claim 1, wherein the reference signal source is a current source and the plurality of reference signals are current reference signals.

3. The time-of-flight light detection system of claim 1, wherein the evaluation circuit is configured to receive a plurality of processed reference signals from the signal path, each of the plurality of processed reference signals being derived from at least one of the plurality of reference signals, and the evaluation circuit is further configured to compare each of the plurality of processed reference signals to at least one of a plurality of expected results to generate a plurality of first comparison results.

4. The time-of-flight light detection system of claim 3, wherein the evaluation circuit is configured to receive the plurality of processed reference signals from at least two extraction points of the signal path.

5. The time-of-flight light detection system of claim 4, wherein the at least two extraction points include a first extraction point upstream from the second circuit and a second extraction point downstream from the second circuit.

6. The time-of-flight light detection system of claim 3, wherein the evaluation circuit is configured to:
   evaluate at least one characteristic of the plurality of signal channels based on the plurality of first comparison results, and determine whether the signal path is functioning normally based thereon.

7. The time-of-flight light detection system of claim 1, wherein the first circuit is a photodetector circuit and the second circuit is one of an amplifier circuit or an analog-to-digital converter circuit.

8. The time-of-flight light detection system of claim 1, wherein:
   the first circuit includes a photodetector array configured to generate electrical signals based on received light,
   the reference signal source is configured to inject one of the plurality of reference signals into each of the plurality of signal channels at the first circuit such that each reference signal is combined with at least one of the electrical signals to generate combined signals that are processed by the signal path to generate processed combined signals, and the evaluation circuit is configured to receive a processed combined signal from the signal path, the evaluation circuit further configured to compare the processed combined signal to a second expected result to generate a second comparison result.

9. The time-of-flight light detection system of claim 8, further comprising:
a filter configured to receive the processed combined signals from the signal path and filter out the plurality of reference signals therefrom to restore the electrical signals; and
signal processing circuitry configured to generate object data based on the restored electrical signals.

10. The time-of-flight light detection system of claim 8, further comprising:
signal processing circuitry configured to receive the processed combined signals from the signal path and generate first object data based on the processed combined signals; and
a filter configured to receive the first object data from the signal processing circuitry, detect virtual object data corresponding to the plurality of reference signals in the first object data, and remove the detected virtual object data from the first object data to generate second object data.

11. The time-of-flight light detection system of claim 8, wherein the evaluation circuit is configured to:
evaluate at least one characteristic of the plurality of signal channels based on the second comparison result, and determine whether the signal path is functioning normally based thereon.

12. The time-of-flight light detection system of claim 1, further comprising:
a memory device configured to store information corresponding to a plurality of different current pulse patterns;
a selection element configured to select one of the plurality of different current pulse patterns and control the reference signal source to generate at least one of the plurality of reference signals based on the selected one of the plurality of different current pulse patterns.

13. The time-of-flight light detection system of claim 12, further comprising:
a system controller configured to modify a configuration of the signal path, and
wherein the selection element is configured to select one of the plurality of different current pulse patterns based on the configuration of the signal path.

14. The time-of-flight light detection system of claim 13, wherein the configuration of the signal path is a gain setting of at least one of the first circuit or the second circuit, wherein:
for a first gain setting, the selection element is configured to select a first one of the plurality of different current pulse patterns,
for a second gain setting, the selection element is configured to select a second one of the plurality of different current pulse patterns, and
the first gain setting is larger than the second gain setting, and the first one of the plurality of different current pulse patterns has a smaller amplitude than an amplitude of the second one of the plurality of different current pulse patterns.

15. The time-of-flight light detection system of claim 1, wherein the first circuit comprises an analog multiplexer coupled to the plurality of signal channels and configured to receive the plurality of reference signals as inputs and route each of the plurality of reference signals to a different one of the plurality of signal channels.

16. The time-of-flight light detection system of claim 15, wherein the reference signal source and the analog multiplexer are controlled to implement a time shift of the plurality of reference signals such that adjacent channels of the plurality of signal channels receive corresponding reference signals of the plurality of reference signals at different times.

17. The time-of-flight light detection system of claim 1, wherein:
a plurality of first time intervals are interleaved with a plurality of second time intervals, wherein the first circuit includes a photodetector array configured to generate electrical signals based on received light during the plurality of first time intervals, wherein the photodetector array is not providing signals to the signal path during the plurality of second time intervals, and
the reference signal source is configured to inject the plurality of reference signals into the plurality of signal channels at the first circuit during the plurality of second time intervals.

18. The time-of-flight light detection system of claim 1, further comprising:
a system controller,
wherein the evaluation circuit is configured to detect a fault in the time-of-flight light detection system based on the first comparison result, and indicate the fault to the system controller, and
the system controller is configured to receive the fault and, in response thereto, perform at least one of: disable the time-of-flight light detection system, reduce a performance of the time-of-flight light detection system, or lower a priority of the time-of-flight light detection system relative to another object scanning sensor.

19. The time-of-flight light detection system of claim 1, wherein the reference signal source is configured to inject the plurality of reference signals between two light acquisition periods of the time-of-flight light detection system.

20. The time-of-flight light detection system of claim 1, wherein the reference signal source is configured to inject the plurality of reference signals during a light acquisition period of the time-of-flight light detection system.

21. A time-of-flight light detection receiver system, comprising:
a plurality of circuits arranged sequentially along a signal path that comprises a plurality of signal channels, the plurality of circuits including a first circuit and a second circuit arranged downstream from the first circuit;
a reference signal source configured to generate a plurality of reference signals, each of the plurality of signal channels at the first circuit receives at least one of the plurality of reference signals;
the first circuit comprising a plurality of readout elements and a plurality of photodetector readout channels representative of a first portion of the plurality of signal channels and coupled to the plurality of readout elements, the plurality of readout elements configured to selectively route the plurality of reference signals to the plurality of photodetector readout channels;
the second circuit comprising a plurality of processing channels representative of a second portion of the plurality of signal channels, the plurality of processing channels including a plurality of processing elements configured to generate processed reference signals derived from the plurality of reference signals and output the processed reference signals from the second circuit; and an evaluation circuit comprising at least one processor, the evaluation circuit coupled to the signal path to receive a processed reference signal of the processed reference signals, the evaluation circuit configured to compare the processed reference signal to a first expected result to generate a first comparison result.

22. A method of evaluating at least one characteristic of a plurality of signal channels in a time-of-flight light detection system that includes a plurality of circuits arranged sequentially along a time-of-flight light detection signal path that comprises the plurality of signal channels, the plurality of circuits including a first circuit and a second circuit arranged along the signal path downstream from the first circuit, the method comprising:

generating a plurality of reference signals;

injecting at least one of the plurality of reference signals into each of the plurality of signal channels at the first circuit such that the plurality of reference signals are processed in the signal path;

generating a processed reference signal from a respective one of the plurality of reference signals by processing the respective one of the plurality of reference signals by at least one of the first circuit or the second circuit to generate the processed reference signal;

comparing the processed reference signal to an expected result to generate a comparison result;

evaluating the at least one characteristic of at least one of the plurality of signal channels based on the comparison result; and determining whether either of the first circuit or the second circuit is defective based on the at least one evaluated characteristic of the at least one of the plurality of signal channels.

23. The time-of-flight light detection system of claim 1, wherein the processed reference signal is derived from a respective one of the plurality of reference signals by processing the respective one of the plurality of reference signals by at least one of the first circuit or the second circuit to generate the processed reference signal.

24. A time-of-flight light detection system, comprising:

a plurality of circuits arranged sequentially along a signal path that comprises a plurality of signal channels, the plurality of circuits comprising a first circuit and a second circuit arranged downstream along the signal path from the first circuit;

a reference signal source configured to generate a plurality of reference signals, wherein each of the plurality of signal channels at the first circuit receives at least one of the plurality of reference signals; and an evaluation circuit comprising at least one processor, the evaluation circuit coupled to the plurality of signal channels to receive a processed reference signal from the signal path, the evaluation circuit further configured to compare the processed reference signal to a first expected result to generate a first comparison result, wherein the processed reference signal is derived from a respective one of the plurality of reference signals by processing the respective one of the plurality of reference signals by at least one of the first circuit or the second circuit to generate the processed reference signal.

\* \* \* \* \*